Feb. 23, 1960

L. SMITH 2,925,927

BOAT TRAILER

Filed Sept. 10, 1958

INVENTOR.
LAIRD SMITH
BY
CORBETT MAHONEY MILLER
& RAMBO ATT'Y'S
BY

Feb. 23, 1960 L. SMITH 2,925,927
BOAT TRAILER
Filed Sept. 10, 1958 2 Sheets-Sheet 2

INVENTOR.
LAIRD SMITH
BY
CORBETT MAHONEY MILLER
& RAMBO ATTY'S

2,925,927

BOAT TRAILER

Laird Smith, Columbus, Ohio

Application September 10, 1958, Serial No. 760,177

2 Claims. (Cl. 214—84)

My invention relates to a boat trailer. It has to do, more particularly, with a trailer to be pulled by an auto or other suitable vehicle and which is designed to receive and support the boat for transportation and/or storage without damage thereto.

According to my invention, I provide a trailer in the form of a chassis supported by suitably arranged wheels. The trailer includes a cradle for receiving and supporting the boat. At the center line of the cradle, I provide suitable transversely arranged and longitudinally spaced rollers on a metal frame with which the keel of the boat is engaged to facilitate movement of the boat onto and off of the trailer. Spaced outwardly of the center line of the cradle, I provide longitudinally extending metal frame members and associated inflatable tubes. During loading and unloading of the boat these tubes are deflated so that the keel will engage the rollers, but when the boat is positioned on the trailer for transportation, the tubes are inflated and are so arranged that they engage the hull of the boat so as to lift the keel from the supporting rollers and provide a cushioning and shock-absorbing arrangement for supporting the boat so that it will not be damaged during transportation.

Various other objects and advantages will be apparent as this description progresses.

In the accompanying drawings, I have illustrated the preferred embodiment of my invention but it is to be understood that specific details may be varied without departing from the basic principles of the invention.

Figure 1:
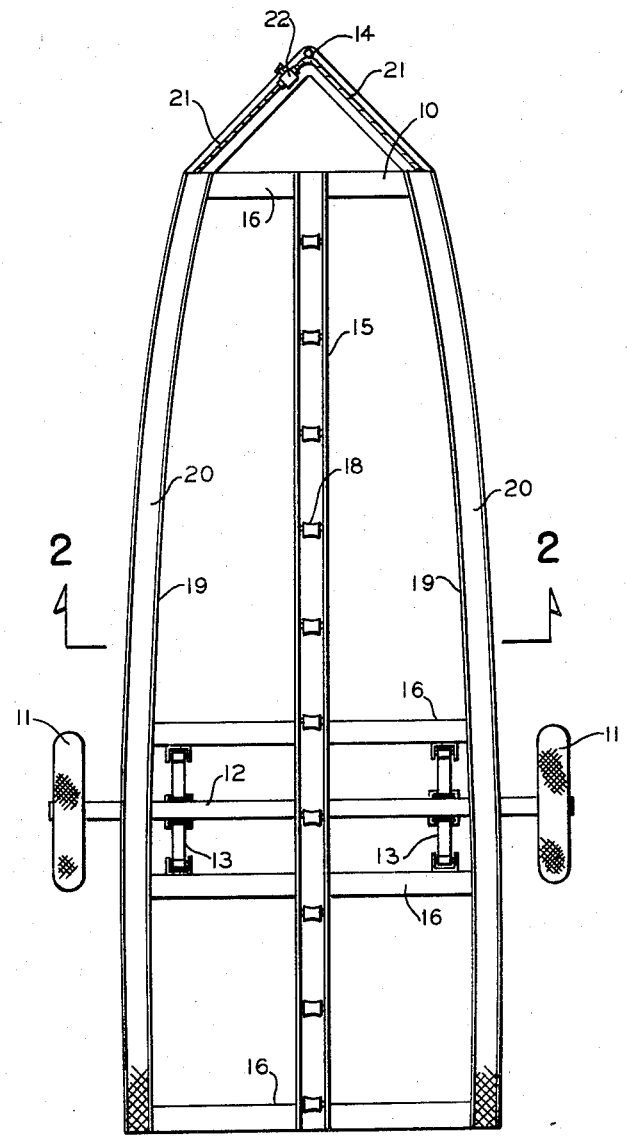
Figure 1 is a plan view of a boat trailer embodying my invention.

With reference to the drawings, I have illustrated my invention embodied in one type of trailer but it is to be understood that it may be embodied in various types of trailers.

In the example shown, the trailer comprises a chassis 10 carried by a pair of wheels 11 supported on an axle 12 adjacent the rear end of the trailer, the axle 12 being attached to the chassis by suitable springs 13. At the forward end of the chassis of the trailer a hitch 14 is provided by means of which the trailer may be pulled by a suitable vehicle.

Figure 2:
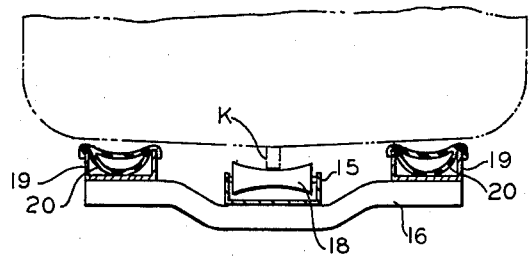
Figure 2 is a transverse sectional view taken along line 2—2 of Figure 1 illustrating the condition of the trailer for loading or unloading of the boat.
Figure 3:
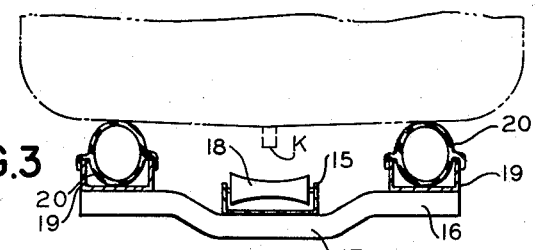
Figure 3 is a similar view but showing the condition of the trailer for transportation and/or storage of the boat.

Extending longitudinally of the trailer at the center line thereof is a roller-receiving upright channel 15 which extends substantially the full length of the trailer. This channel 15 is rigidly secured to the transverse frame members 16 which are depressed at their mid-portions 17 to receive the channel, as indicated in Figures 2 and 3. The channel 15 suitably supports the transversely disposed rollers 18 for rotation about axes transversely of the channel. These rollers are of the concave type and are spaced longitudinally of the channel at suitable intervals.

Disposed outwardly of the channel 15 adjacent the outer ends of the frame cross members 16 and at a higher level are the tube-receiving upright channels 19 which are suitably rigidly secured to the cross members 16. These channels 19 are preferably curved to conform substantially to the curvature of the hull of the boat to be supported on the trailer. Each of the channels 19 receives a boat-supporting inflatable tube 20. Each tube 20 will be closed at its rear end and at its front end will be connected to air lines 21 that, in turn, are connected to an air pressure regulator valve 22 of a suitable type by means of which the tubes may be inflated or deflated. Air under pressure may be supplied to the tubes 20 through the valve 22 from a pump, compressor, or any other suitable well-known unit.

Figure 4:
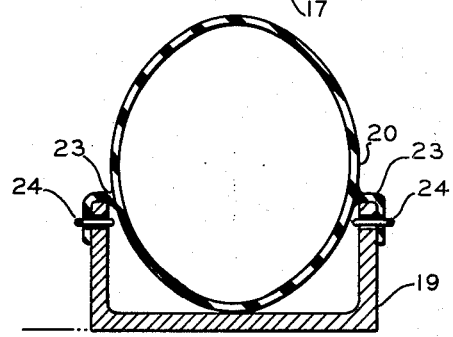
Figure 4 is a detail in enlarged transverse section of one of the boat-supporting tubes, showing it inflated, and illustrating the associated tube-retaining channel.
Figure 5:
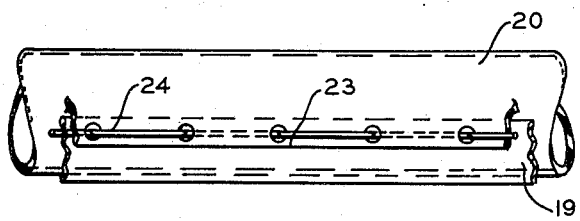
Figure 5 is a side elevational view of the structure of Figure 4.

Each tube is preferably of oval cross-section and may be formed from rubber, plastic, or other suitable airtight flexible material. At each side, the tube 20 may have an integral continuous flange 23 projecting outwardly therefrom. The tube 20 will be disposed in the upright channel 19 and will be retained therein. The flexible flanges 23 of the tube will extend over and downwardly of the upright flanges of the middle channel and may be laced thereto by means of laces 24 which pass through suitable openings formed in the tube flanges 23 and the flanges of the middle channel. When inflated, the tubes 20 will extend upwardly out of the channels 19, as indicated in Figure 4.

In the use of this trailer, the inflatable tubes 20 are deflated during the unloading and loading of the boat on the trailer, as indicated in Figure 2. During this loading and unloading, the keel K will be engaged with the rollers 18 to facilitate movement of the boat forwardly or rearwardly of the trailer. In loading the boat, as soon as it is positioned forwardly of the trailer into its final position, the tubes 20 are inflated. During inflation, the tubes 20 will engage the hull of the boat and bodily lift it so that the keel K will be spaced above the rollers 18, since the upper surfaces of the inflated tubes will be at a considerably higher level than the upper surfaces of the rollers 18. The inflated tubes 20 will, therefore, provide a supporting cradle which will serve as a cushioning and shock-absorbing means to prevent damage to the boat during transportation. When the boat is to be removed, it is merely necessary to deflate the tubes 20 and allow the keel K to settle onto the rollers 18. Then the boat can be moved rearwardly, it being apparent that the tubes 20, covering the flanges of the metal channel 19, will prevent injury to the hull of the boat even though it rocks to one side or the other on the keel K.

It will be apparent that I have provided a boat trailer having a novel boat-receiving and supporting cradle arrangement which will suport the boat during transportation without danger of damage thereto. Furthermore, the cradle arrangement is such that the boat may be easily loaded and unloaded.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. A boat transporting vehicle comprising a chassis including a frame provided with a cradle for receiving and supporting a boat for transportation, said cradle including a longitudinally extending support carried by the frame and extending along the center line of the frame for engaging the keel of the boat during loading and unloading thereof on the vehicle, longitudinally extending inflatable tubes carried by the frame at locations which are spaced equally and laterally from said keel-engaging support at opposite sides thereof, said keel-engaging support having keel-engaging means at a different level lower than the level of the upper surfaces of said tubes when inflated and the difference in level being such that when the tubes are deflated the keel of the boat will engage said keel-engaging means of the support and will be supported thereby and when the tubes are inflated they will engage the hull of the boat and lift it so that the keel is lifted from said keel-engaging means to cushion and support the boat solely by said tubes independently of such means.

2. A boat-transporting vehicle according to claim 1 including longitudinally extending upwardly opening channels disposed at opposite sides of the center line of the frame and in which said inflatable tubes are disposed and secured, said tubes being continuous and when inflated projecting upwardly from said channels so as to engage the hull of the boat continuously throughout a substantial part of its length, said keel-engaging support comprising an upwardly opening channel extending longitudinally of the frame at the center line thereof and being at a lower level than said tube-receiving channels, said keel-engaging means of said keel-engaging support comprising rollers which are disposed transversely at longitudinally spaced intervals in said last-named channel.

References Cited in the file of this patent
UNITED STATES PATENTS

| | | |
|---|---|---|
| 2,200,661 | Templeton | May 14, 1940 |
| 2,865,522 | Peterson et al. | Dec. 23, 1958 |